(12) United States Patent
Kakuta

(10) Patent No.: US 8,690,356 B2
(45) Date of Patent: Apr. 8, 2014

(54) VIDEO DISPLAY DEVICE AND LIGHT GUIDE MODULE WITH A LIGHT SHIELDING PLATE HAVING A PLURALITY OF OPENINGS

(75) Inventor: Yoshinori Kakuta, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 117 days.

(21) Appl. No.: 13/352,056

(22) Filed: Jan. 17, 2012

(65) Prior Publication Data

US 2012/0194748 A1 Aug. 2, 2012

(30) Foreign Application Priority Data

Jan. 31, 2011 (JP) ................................ 2011-017469

(51) Int. Cl.
*G03B 21/14* (2006.01)
(52) U.S. Cl.
USPC ................ 353/88; 353/33; 353/37; 353/38; 353/97; 353/99; 348/744; 348/E9.025
(58) Field of Classification Search
USPC ................ 353/33, 37, 38, 88, 97, 99, 119; 348/744–747, E9.025; 349/5, 7–9
See application file for complete search history.

(56) References Cited

U.S. PATENT DOCUMENTS

| 7,210,795 | B2 * | 5/2007 | Hara et al ................ 353/88 |
| 7,311,403 | B2 | 12/2007 | Yoshii et al. |
| 7,726,819 | B2 | 6/2010 | Shouji |
| 7,905,630 | B2 | 3/2011 | Dalsgaard |
| 8,354,790 | B2 * | 1/2013 | Iwanaga ................ 313/506 |
| 2006/0238720 | A1 | 10/2006 | Lee et al. |
| 2007/0064198 | A1 * | 3/2007 | Yoshimura ................ 353/20 |
| 2010/0118213 | A1 * | 5/2010 | Kato et al. ................ 348/750 |

FOREIGN PATENT DOCUMENTS

| CN | 1854807 A | 11/2006 |
| CN | 1971405 A | 5/2007 |
| CN | 101430073 A | 5/2009 |
| JP | 2005-316406 A | 11/2005 |
| JP | 4572163 B2 | 10/2010 |

* cited by examiner

*Primary Examiner* — Sultan Chowdhury
(74) *Attorney, Agent, or Firm* — Birch, Stewart, Kolasch & Birch, LLP

(57) ABSTRACT

A video display device includes a light guide unit for guiding outgoing light from a light source unit to a pixel area of a display device. The light guide unit includes a rod integrator having an input opening through which the outgoing light from the light source unit enters and an output opening provided on a side opposite to the input opening, and a light shielding plate provided between the input opening of the rod integrator and the light source unit. The light shielding plate has a plurality of types of openings for passing the outgoing light from the light source unit to the rod integrator. The light shielding plate is arranged in a state where one of the plurality of types of openings, which has a shape similar to that of the input opening of the rod integrator which is actually mounted, is aligned with the input opening.

9 Claims, 10 Drawing Sheets

F I G . 1
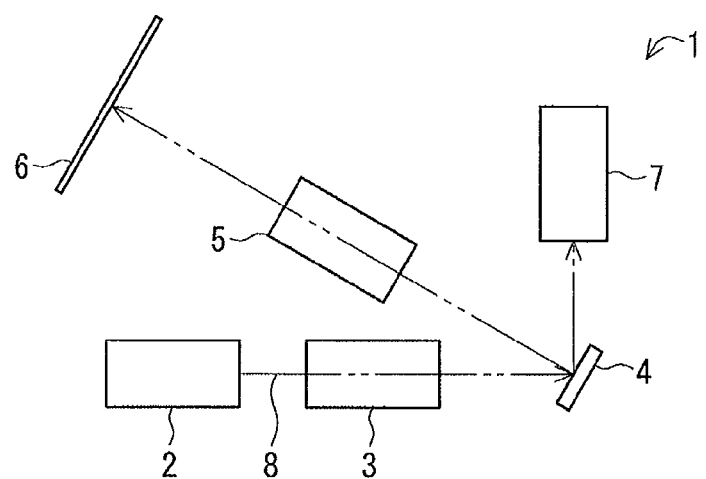

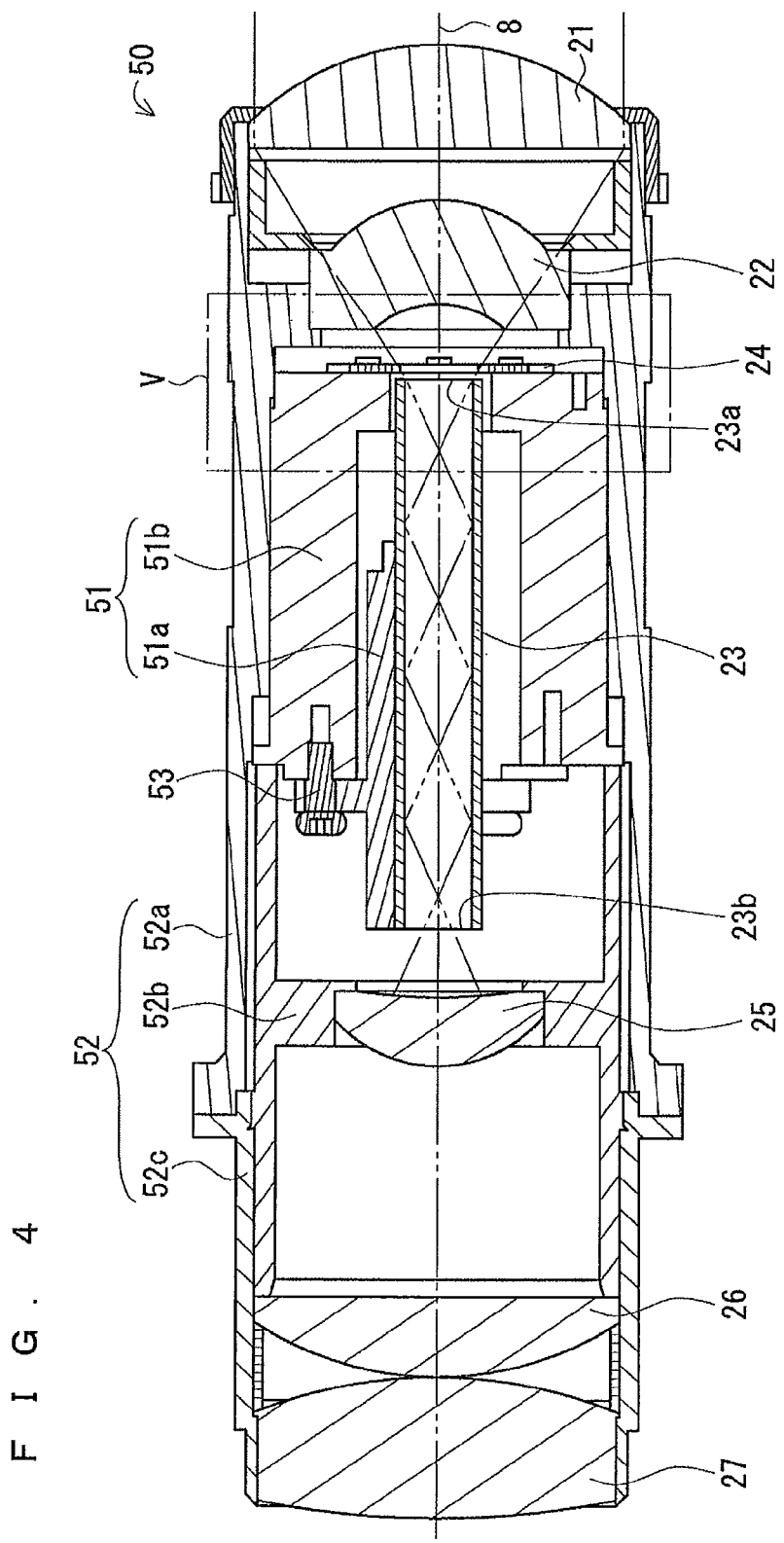
F I G . 4

F I G . 9
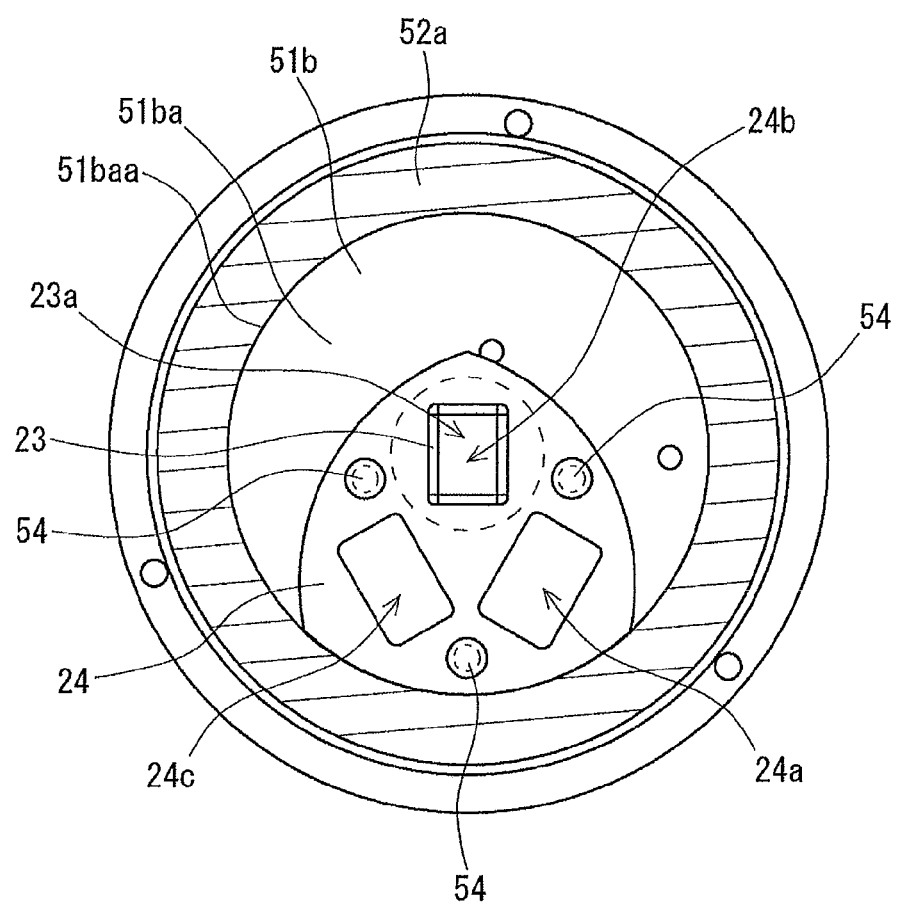

VIDEO DISPLAY DEVICE AND LIGHT GUIDE MODULE WITH A LIGHT SHIELDING PLATE HAVING A PLURALITY OF OPENINGS

BACKGROUND OF THE INVENTION

1. Field of the Invention

The present invention relates to a video display device and a light guide module which can be applied to the same.

2. Description of the Background Art

U.S. Pat. No. 4,572,163 (Patent Document 1) discloses a projection display device. In the projection display device, outgoing light from a xenon lamp is condensed, passing through an opening of a light shielding plate, and enters an input opening of a rod integrator.

The light shielding plate is fixed on a support mount, standing in front of the rod integrator, and the opening thereof is so provided as to face the input opening of the rod integrator. With this structure, necessary light enters the rod integrator while unnecessary light is reflected on the light shielding plate toward the xenon lamp. The opening of the light shielding plate is configured to be larger than the input opening of the rod integrator.

The light entering the rod integrator is repeatedly reflected on an inner surface of the rod integrator and goes out from an output opening thereof as light which is rectangularly transformed to have improved uniformity. The light outgoing from the rod integrator goes through a lens, a mirror, a prism, and the like, and is modulated by a display device such as a DMD (Digital Micromirror Device) or the like and projected on a screen as video light.

In general, by forming the opening of the light shielding plate and the input opening of the rod integrator as rectangles with the same aspect ratio (in other words, as similar rectangles), it is possible to cause the light passing through the light shielding plate to enter the rod integrator with high efficiency.

Further, by forming the input opening and the output opening of the rod integrator to have the same aspect ratio as that of a pixel area of the display device, it is possible to use illumination light in the display device without any waste and therefore display a bright video image on the screen.

Pixel areas of display devices, however, have various aspect ratios, such as well-known 4:3 and 16:9. For this reason, in the structure of the above-discussed background art, for the display device with the aspect ratio of 4:3, it is necessary to provide a rod integrator having an input opening and an output opening with the aspect ratio of 4:3 and a light shielding plate having an opening with the aspect ratio of 4:3 while for the display device with the aspect ratio of 16:9, it is necessary to provide a rod integrator having an input opening and an output opening with the aspect ratio of 16:9 and a light shielding plate having an opening with the aspect ratio of 16:9.

Further, there is sometimes a case where even display devices having the same aspect ratio have pixel areas of different sizes. For this reason, it is necessary to prepare a rod integrator and a light shielding plate for each size of pixel area.

Specifically, in the structure of the above-discussed background art, it is necessary to provide both a rod integrator and a light shielding plate as exclusive ones in accordance with the aspect ratio and the size of a pixel area of a display device.

In other words, the rod integrator and the light shielding plate can be used only as a particular one-to-one combination.

SUMMARY OF THE INVENTION

It is an object of the present invention to provide a video display device having a structure in which one type of light shielding plate is adaptable to a plurality of types of rod integrators. It is another object of the present invention to provide a light guide module which can be applied to the video display device.

According to an aspect of the present invention, the video display device includes a light source unit, a display device having a pixel area in which a display video image is to be formed, and a light guide unit for guiding outgoing light from the light source unit to the pixel area of the display device. The light guide unit includes a rod integrator having an input opening through which the outgoing light from the light source unit enters and an output opening provided on a side opposite to the input opening, and a light shielding plate provided between the input opening of the rod integrator and the light source unit. The light shielding plate has a plurality of types of openings for passing the outgoing light from the light source unit to the rod integrator. The light shielding plat is arranged in a state where one of the plurality of types of openings, which has a shape similar to that of the input opening of the rod integrator which is actually mounted, is aligned with the input opening.

In the video display device according to the above aspect, the light shielding plate has a plurality of types of openings and one of the openings is selectively used. Therefore, it is possible to provide a structure in which one type of light shielding plate is adaptable to a plurality of types of rod integrators.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a schematic structural diagram showing a video display device in accordance with a preferred embodiment of the present invention;

FIG. 4 is a cross section showing the video display device in accordance with the preferred embodiment;

FIGS. 9 and 10 are cross sections corresponding to FIG. 6; and

DESCRIPTION OF THE PREFERRED EMBODIMENTS

Figure 2:
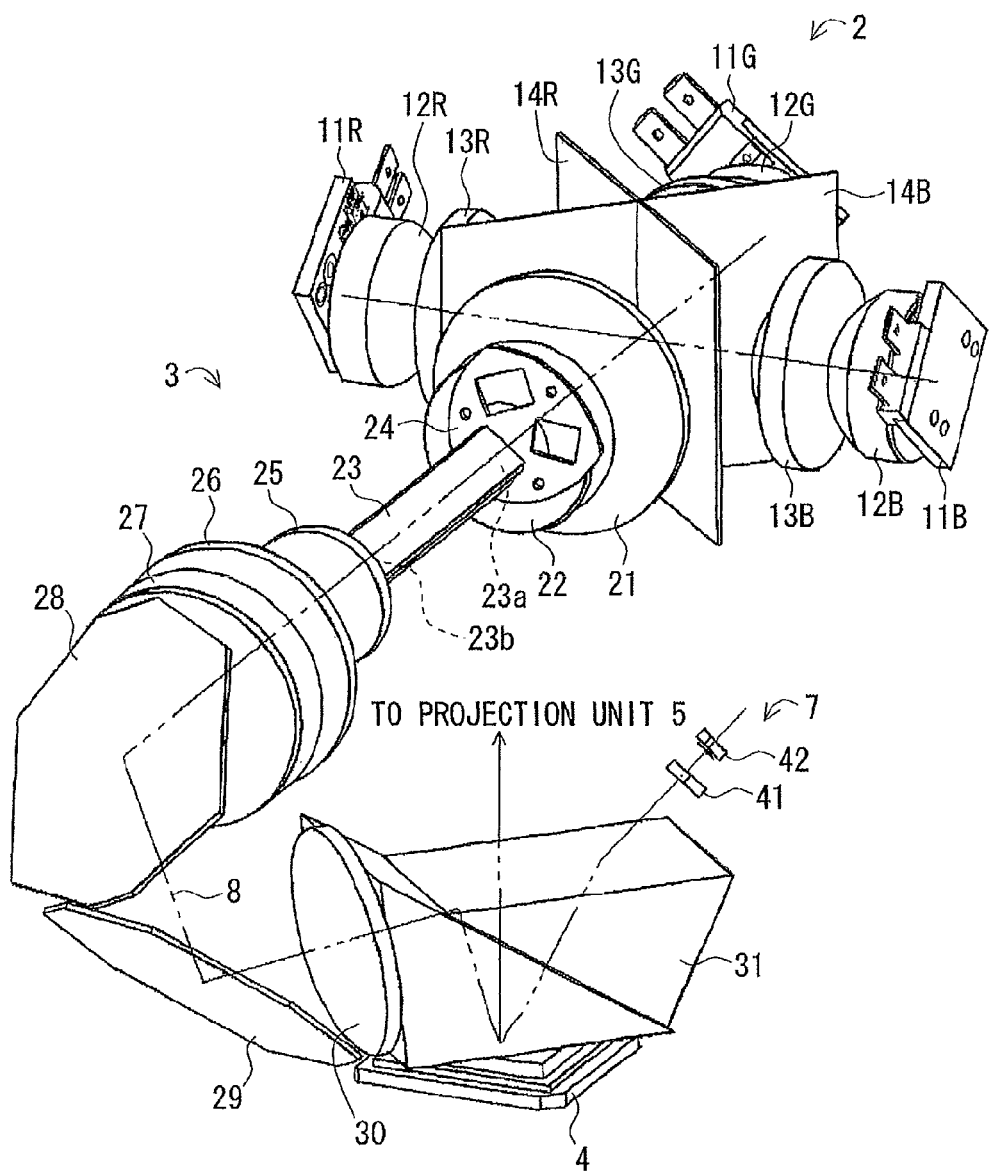
FIG. 2 is a perspective view showing the video display device in accordance with the preferred embodiment.

FIG. 1 is a schematic structural diagram showing a video display device 1 in accordance with the preferred embodiment of the present invention. In an exemplary case of FIG. 1, the video display device 1 is a projection-type video display device (so-called projector) and includes a light source unit 2, a light guide unit 3, a display device 4, a projection unit 5, a screen 6, and a photodetector unit 7.

Hereinafter, since discussion will be made mainly on an optical system of the video display device 1 and a related structure thereof, illustration and detailed description on an electrical power system, a processing system, a control system, and the like will be omitted. In other words, various already-existing structures can be applied to the electrical power system, the processing system, the control system, and the like of the video display device 1.

The light source unit 2 is configured to emit illumination light to be used for projection of a display video image. For clear illustration, an optical axis (in other words, optical path) 8 of outgoing light from the light source unit 2 is indicated by two-dot chain line. The light guide unit 3 is configured to guide the light emitted from the light source unit 2 to the display device 4.

The display device 4 is configured to acquire the illumination light guided by the light guide unit 3 and display video image data, process the illumination light on the basis of the display video image data, and emit processed light (in other words, a display video image). The display device 4 has an area (hereinafter, referred to also as a "pixel area") in which pixels are arranged to form the display video image, and the outgoing light from the light source unit 2 is irradiated to the pixel area through the light guide unit 3. The state of each pixel is controlled on the basis of the display video image data associated therewith, and a display video image is thereby formed.

Herein, a DMD (Digital Micromirror Device) is taken as an example of the display device 4, and the display device 4 will be referred to also as a DMD 4. Other display devices, however, such as a liquid crystal panel and the like can be also adopted.

The projection unit 5 is configured to enlargedly project the display video image formed by the display device 4. The screen 6 is a member onto which the outgoing light from the projection unit 5 is projected. Herein, the video display device 1 may have a structure (so-called front type) in which the display video image on the screen 6 is seen from the same side of the projection unit 5 or have a structure (so-called rear type) in which the display video image on the screen 6 is seen from the side opposite to the projection unit 5. Further, in the case of the front type, the structure except the screen. 6 may be referred to as the video display device 1.

The photodetector unit 7 is configured to detect reflected light in an OFF state of the DMD 4. The intensity of light measured by the photodetector unit 7 is used for, e.g., the level monitor of the outgoing light from the light source unit 2.

FIG. 2 is a perspective view showing a partial structure of the video display device 1. FIG. 2 shows the light source unit 2, the light guide unit 3, the DMD 4, and the photodetector unit 7.

In an exemplary case of FIG. 2, the light source unit 2 includes semiconductor light emitting modules 11R, 11G, and 11B, collimator lenses 12R, 13R, 12G, 13G, 12B, and 13B, and dichroic mirrors 14R and 14B.

The semiconductor light emitting module 11R has a structure in which a semiconductor light emitting element (an LED, a laser, or the like) for emitting red light (hereinafter, referred to also as "R light") is mounted on a base. The semiconductor light emitting module 110 also has the same structure and emits green light (hereinafter, referred to also as "G light"). The semiconductor light emitting module 11B also has the same structure and emits blue light (hereinafter, referred to also as "B light"). The semiconductor light emitting modules 11R, 11G, and 11B are controlled to emit light in turn in a predetermined cycle.

The collimator lenses 12R and 13R are so provided as to shape the outgoing light from the semiconductor light emitting module 11R into parallel luminous flux. Similarly, the collimator lenses 12G and 13G are so provided as to shape the outgoing light from the semiconductor light emitting module 11G into parallel luminous flux, and the collimator lenses 12B and 13B are so provided as to shape the outgoing light from the semiconductor light emitting module 11B into parallel luminous flux.

The dichroic mirror 14R has such a structure as to reflect the R light emitted from the semiconductor light emitting module 11R, and is provided so that the R light which goes through the collimator lenses 12R and 13R enters the dichroic mirror 14R. The G light emitted from the semiconductor light emitting module 11G and the B light emitted from the semiconductor light emitting module 11B pass through the dichroic mirror 14R.

The dichroic mirror 14B has such a structure as to reflect the B light emitted from the semiconductor light emitting module 11B, and is provided so that the B light which goes through the collimator lenses 12B and 13B enters the dichroic mirror 14B. The R light emitted from the semiconductor light emitting module 11R and the G light emitted from the semiconductor light emitting module 11G pass through the dichroic mirror 14B.

In the exemplary case of FIG. 2, the dichroic mirrors 14R and 14B are intersected each other, and the semiconductor light emitting modules 11R, 11G, and 11B are provided in three of the four directions sectioned by the dichroic mirrors 14R and 14B, respectively, and the light guide unit 3 is provided in the other one direction.

In the exemplary arrangement, the R light emitted from the semiconductor light emitting module 11R, going through the collimator lenses 12R and 13R, is reflected on the dichroic mirror 14R while passing through the dichroic mirror 14B, and then enters the light guide unit 3. Similarly, the B light emitted from the semiconductor light emitting module 11B, going through the collimator lenses 12B and 13B, is reflected on the dichroic mirror 14B while passing through the dichroic mirror 14R, and then enters the light guide unit 3. Further, the G light emitted from the semiconductor light emitting module 11G, going through the collimator lenses 12G and 13G, passes through the dichroic mirrors 14R and 14B and then enters the light guide unit 3.

The semiconductor light emitting modules 11R, 11G, and 11B, the collimator lenses 12R, 13R, 12G, 13G, 12B, and 13B, and dichroic mirrors 14R and 14B are arranged so that the R light, the G light, and the B light which are emitted from the light source unit 2 (in other words, enter the light guide unit 3) may go along the same optical path.

The constitution of the light source unit 2 is not limited to this example.

In the exemplary case of FIG. 2, the light guide unit 3 includes condensing lenses 21 and 22, a rod integrator 23, a light shielding plate 24, relay lenses 25, 26, and 27, mirrors 28 and 29, a relay lens 30, and a prism 31.

The condensing lenses 21 and 22 are so provided as to condense the R light, the G light, and the B light emitted from the light source unit 2. The condensed R light, G light, B light enter the rod integrator 23 through an opening (described later) of the light shielding plate 24.

The rod integrator 23 is a rectangular tube in a cross section, and an inner surface of the tube is configured to reflect the R light, the G light, and the B light emitted from the light source unit 2. The rod integrator 23 can be formed by, for example, assembling four reflection mirrors into a tube so that the cross section thereof may be rectangle and fixing the mirrors by an adhesive.

The light entering an opening 23a on one end (hereinafter, referred to also as an "input opening 23a") of the rod integrator 23 is reflected on the inner surface of the rod integrator 23 a large number of times and goes out from an opening 23b on the other end (hereinafter, referred to also as an "output opening 23b"). By going through the rod integrator 23, a cross-sectional shape (a shape in a surface orthogonal to the optical axis 8) of the luminous flux which enters the input opening 23a is transformed into a rectangle in accordance with the cross-sectional shape (a shape in a surface orthogonal to the optical axis 8) of the rod integrator 23 and the intensity of light in the rectangular cross section is made uniform, and such shaped luminous flux goes out from the output opening 23b. Specifically, the R light, the G light, and the B light condensed by the condensing lenses 21 and 22 are shaped as above by going through the rod integrator 23.

Herein, discussion will be made on a case where the rod integrator 23 have the same cross-sectional shape at any points in a longitudinal direction thereof. In this case, the input opening 23a and the output opening 23b have the same shape. Further, the input opening 23a and the output opening 23b may have different shapes.

The light shielding plate 24 is provided between the input opening 23a of the rod integrator 23 and the condensing lens 22 (in other words, provided between the input opening 23a of the rod integrator 23 and the light source unit 2). The light shielding plate 24 is provided to block light which does not enter the rod integrator 23 (in other words, unnecessary light) out of the luminous flux of the R light, the G light, and the B light which are condensed by the condensing lenses 21 and 22. As the above unnecessary light, for example, there are light which enters an end surface (on the side of the input opening 23a) of a reflection mirror which is a constituent of the rod integrator 23, going through the inside of the reflection mirror, and goes out from an end surface on the side of the output opening 23b and light which goes on outside the reflection mirrors.

Further, since the heat of the unnecessary light deteriorates the adhesive strength of the adhesive which affixes the reflection mirrors to one another, it is possible to prevent the deterioration in the adhesive strength by using the light shielding plate 24. As a result, it is possible to prevent deformation of the rod integrator 23.

Detailed discussion will be made later on the light shielding plate 24.

The relay lenses 25, 26, and 27 are provided to shape the outgoing light from the rod integrator 23 into parallel luminous flux. The mirrors 28 and 29 are so arranged as to guide the parallel luminous flux formed by the relay lenses 25, 26, and 27 to the prism 31. The relay lens 30 is provided between the prism 31 and the mirror 29.

The prism 31 can refract or pass light depending on an incident angle thereof. In view of this characteristic, the prism 31 is so configured and arranged as to (i) guide the illumination light coming from the light source unit 2 to the DMD 4, (ii) guide the reflected light in an ON state of the DMD 4 to an optical path different from the optical path along which the light comes from the light source unit 2, and (iii) guide the reflected light in the OFF state of the DMD 4 to an optical path different from the optical paths along which the light comes from the light source unit 2 and the reflection optical path in the ON state of the DMD 4.

In the exemplary case of FIG. 2, the reflection optical path in the ON state forms an angle of substantial 90 degrees with respect to a surface of the pixel area of the DMD 4 and the reflection optical path in the OFF state forms an angle smaller than 90 degrees with respect to the surface of the pixel area. Further, the optical path of the illumination light entering the DMD 4 forms an angle smaller than 90 degrees and larger than the above angle of the reflection optical path in the OFF state with respect to the surface of the pixel area.

The DMD 4 acquires a video signal outputted from a video generator circuit and the light emitting order and the light emitting cycle of the semiconductor light emitting modules 11R, 11G, and 11B, and controls the state of each pixel, i.e., a posture angle (ON state or OFF state) of a micromirror on the basis of the acquired information.

The reflected light in the ON state of the DMD 4 is guided to the projection unit 5 (see FIG. 1) by the prism 31, to thereby form a display video image. On the other hand, the reflected light in the OFF state of the DMD 4 is guided to the photodetector unit 7 by the prism 31.

In the exemplary case of FIG. 2, the photodetector unit 7 includes a diffusion plate 41 and a luminance sensor 42. Specifically, the diffusion plate 41 and the luminance sensor 42 are arranged so that the light coming from the prism 31 (in other words, the reflected light in the OFF state of the DMD 4) may enter the luminance sensor 42 through the diffusion plate 41. The luminance sensor 42 is a sensor, for example, in which output current is changed in accordance with the quantity of received light.

Figure 3:
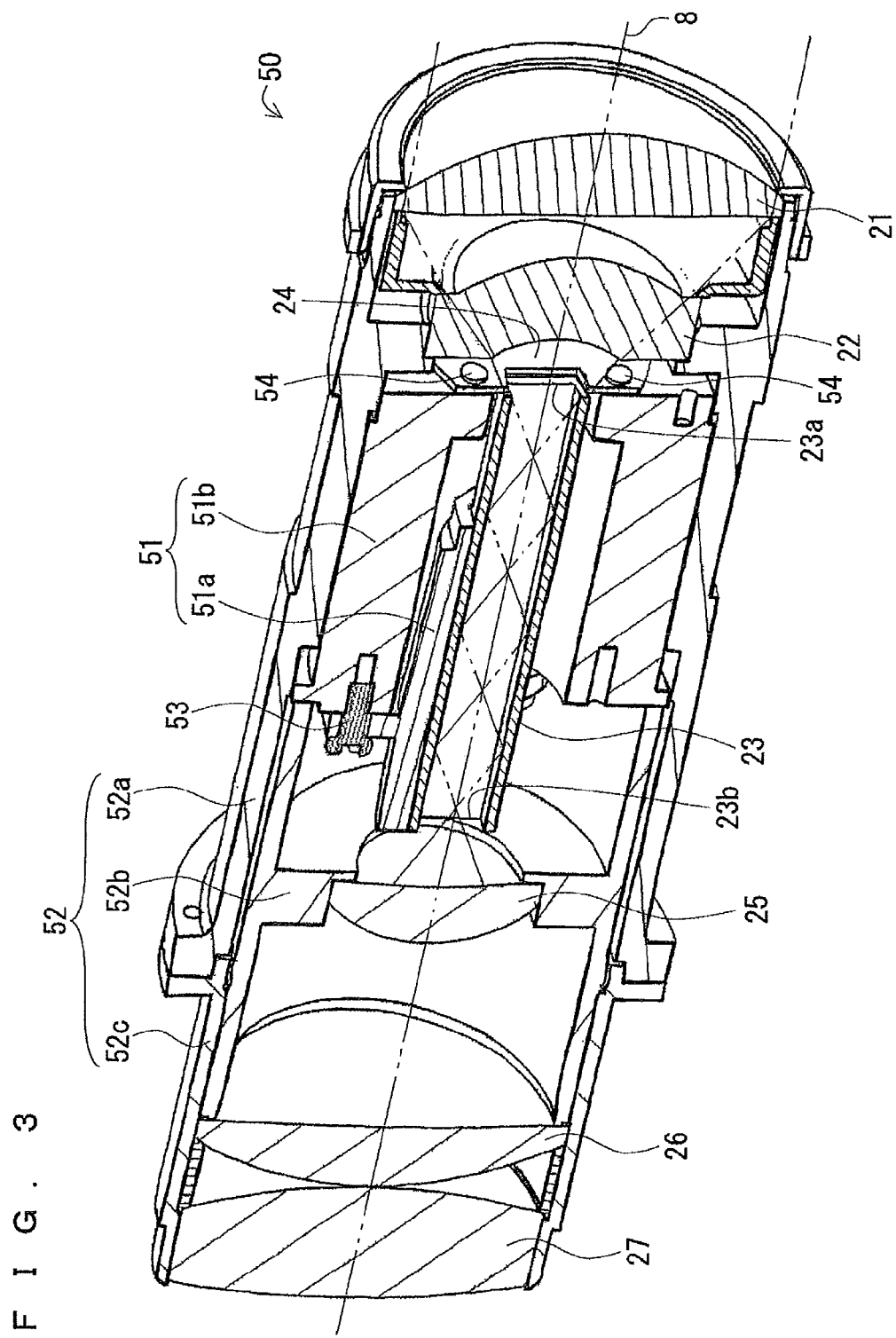
FIG. 3 is a perspective view including a cross section, showing the video display device in accordance with the preferred embodiment.
Figure 5:
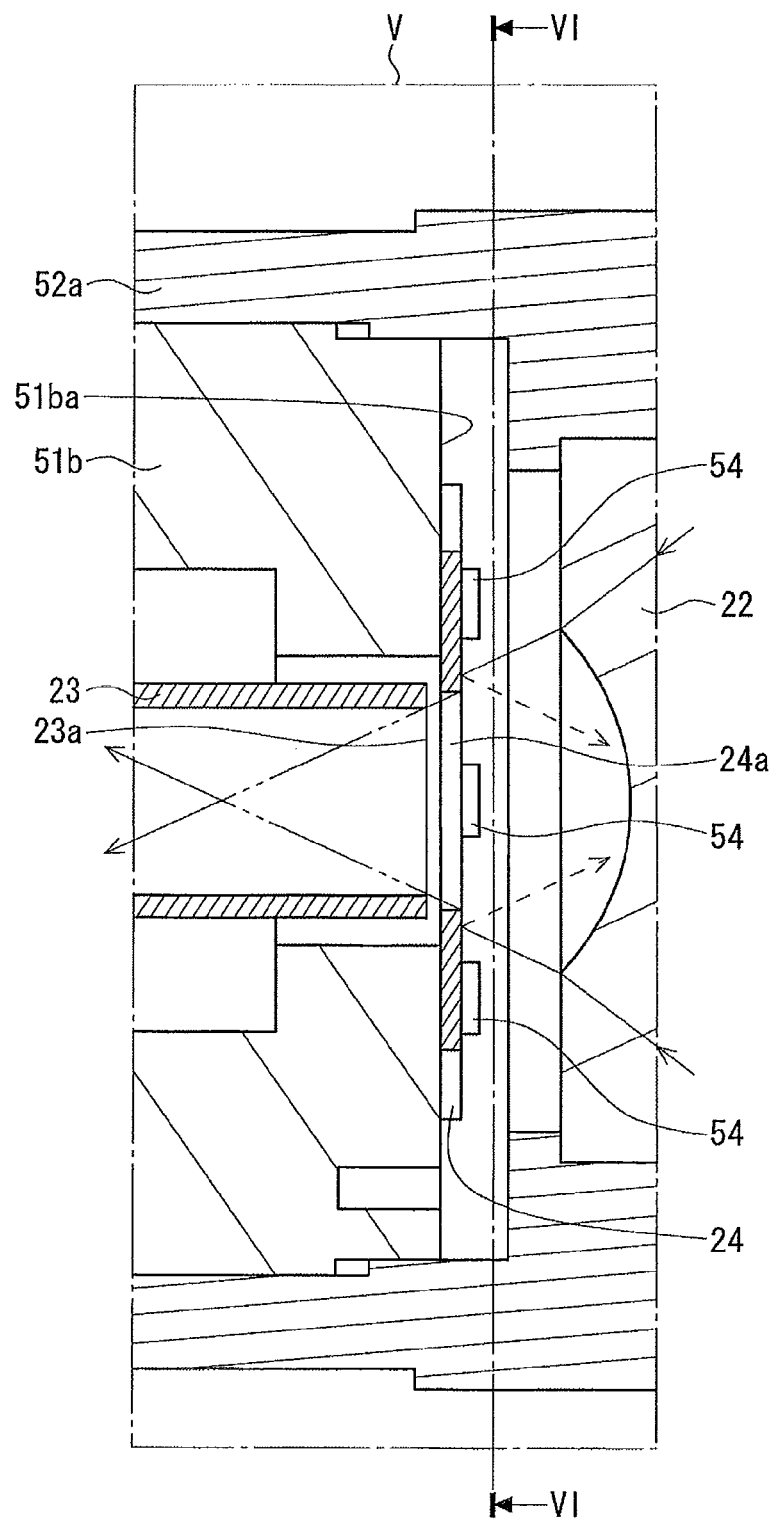
FIG. 5 is an enlarged view of a portion V surrounded by one-dot chain line in FIG. 4.
Figure 6:
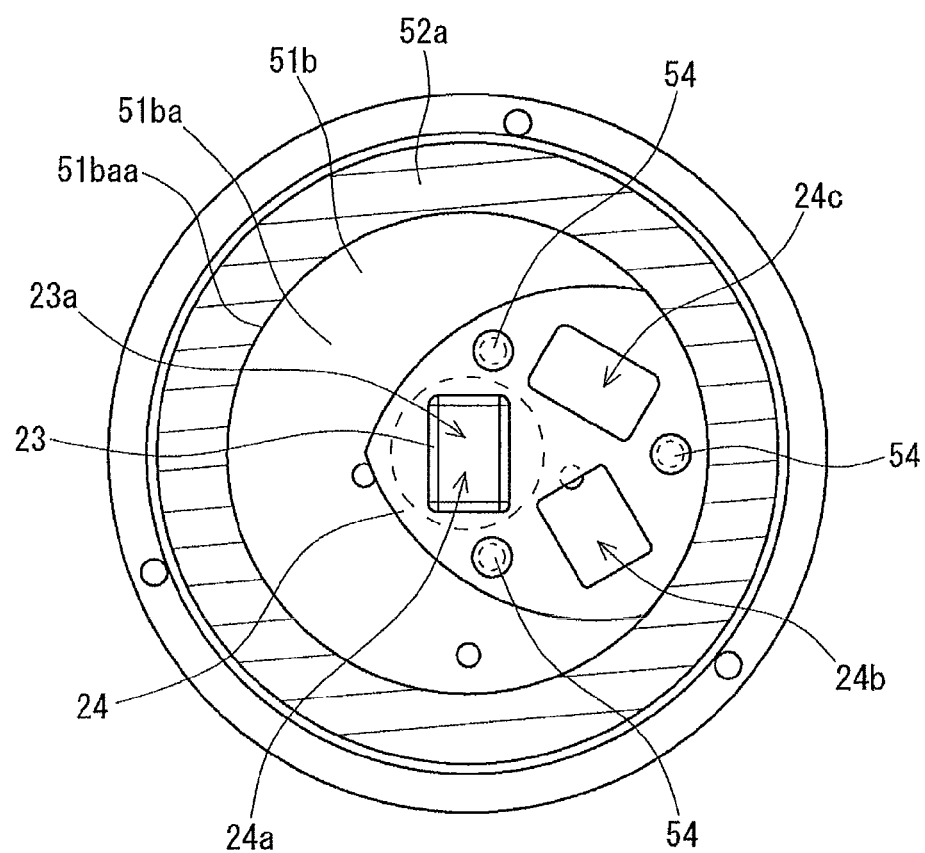
FIG. 6 is a cross section taken along the line VI-VI of FIG. 5.
Figure 7:
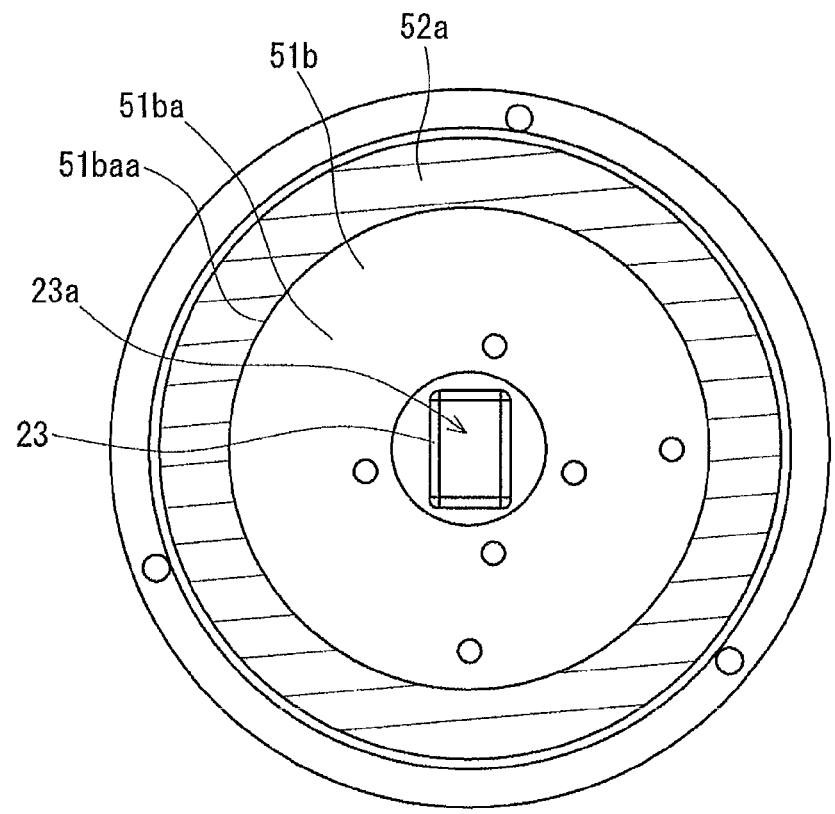
FIG. 7 is a view showing a state where a light shielding plate is removed from FIG. 6.

FIGS. 3 and 4 are a perspective view and a cross section, respectively, showing a partial structure of the video display device 1. FIG. 3 is a perspective view including the cross section shown in FIG. 4. Further, FIG. 5 is an enlarged view of a portion V surrounded by one-dot chain line in FIG. 4. FIG. 6 is a cross section taken along the line VI-VI of FIG. 5. Furthermore, for clear illustration, FIG. 7 shows a state where the light shielding plate 24 is removed from FIG. 6.

FIGS. 3 to 7 show a specific example of a structure of the light guide unit 3 (see FIGS. 1 and 2). FIGS. 3 to 7 illustrate a modularized structure in which the condensing lenses 21 and 22, the rod integrator 23, the light shielding plate 24, and the relay lenses 25, 26, and 27 are held as one unit. This module is referred to as a light guide module 50.

The light guide module 50 shown in FIGS. 3 to 7 includes a holding member 51 for the rod integrator 23 and a lens barrel 52 as well as the above-discussed constituent elements 21 to 27.

The holding member 51 is constituted of a first holding member 51a and a second holding member 51b in the exemplary structure shown in FIGS. 3 to 7. The first holding member 51a is fastened to the rod integrator 23, and the first holding member 51a holding the rod integrator 23 is fixed to the second holding member 51b by a screw 53. The light shielding plate 24 is fixed to the second holding member 51b by a screw 54. Further, various means other than the screws 53 and 54 may be also adopted.

The lens barrel 52 has a structure in which a first lens barrel 52a, a second lens barrel 52b and a third lens barrel 52c are coupled to one another in the exemplary case shown in FIGS. 3 to 7. Herein, inner shapes of the lens barrels 52a, 52b, and 52c are each a circle in a cross section (see FIGS. 6 and 7) orthogonal to a central axis of the lens barrel 52. The first lens barrel 52a accommodates the condensing lenses 21 and 22 and the holding member 51 on which the rod integrator 23 and the light shielding plate 24 are fixed. The second lens barrel 52b accommodates the relay lens 25 and the third lens barrel 52c accommodates the relay lenses 26 and 27.

The above-discussed constituent elements 21 to 27 are positioned and fixed in the lens barrel 52 in a state where a virtual spherical center of those lenses 21, 22, 25, 26, and 27, an opening center of the input opening 23a and the output opening 23b of the rod integrator 23 (in other words, a central axis of the rod integrator 23), and an opening center of an opening (described later) of the light shielding plate 24 coincide with the optical axis of the illumination light supplied from the light source unit 2 (se FIGS. 1 and 2).

Herein, the holding member 51 may have an arbitrary shape, but it is preferable that the holding member 51 should have such a shape as to control the movement of the holding member 51 in the surface orthogonal to the central axis of the lens barrel 52 (which corresponds to the above-discussed optical axis 8) with the holding member 51 coming into contact with an inner wall of the lens barrel 52. With this structure, only by inserting the holding member 51 into the lens barrel 52, it is possible to position the rod integrator 23 and the light shielding plate 24 in the surface orthogonal to the central axis.

As an example of the above shape, the second holding member 51b shown in FIGS. 3 to 7 has a cylindrical shape having the same shape and size as those of an internal space of the first lens barrel 52a in at least a portion thereof. Further, by making the central axis of the cylindrical shape and the central axis of the rod integrator 23 coincident with each other, it is possible to easily align the central axis of the rod integrator 23 with the central axis of the lens barrel 52.

In the exemplary structure shown in FIGS. 3 to 7, the above-discussed cylindrical shape of the second holding member 51b has an end surface 51ba on the side of the input opening 23a of the rod integrator 23, which is orthogonal to the central axis of the lens barrel 52 and faces the condensing lenses 21 and 22 in a direction of the central axis of the lens barrel 52, and the end surface 51ba has such a shape as to surround the input opening 23a of the rod integrator 23. More specifically, since the above-discussed cylindrical shape of the second holding member 51b has such a hollow as to accommodate the rod integrator 23 therein and the hollow space leads to the end surface 51ba, the center portion of the end surface 51ba is opened. At the opening of the end surface 51ba, the input opening 23a of the rod integrator 23 is positioned. As shown in FIGS. 3 to 6, the light shielding plate 24 is attached to the end surface 51ba.

Herein, the pixel area of the DMD 4, the input opening 23a and the output opening 23b of the rod integrator 23, and the opening of the light shielding plate 24 have similar shapes (more specifically, in a plan view).

Further, a case where the homothetic ratio is "1" (in other words, a congruent shape) is also regarded as one form of a similar shape.

So long as those elements have similar shapes, the output opening 23b of the rod integrator 23 may be larger or smaller than the pixel area of the DMD 4, or may have the same size as that of the pixel area of the DMD 4, because the cross-sectional size of the rectangular luminous flux which goes out from the rod integrator 23 can be controlled by the relay lenses 25, 26, 27, and the like before the emission to the DMD 4. In FIG. 2, shown is a case where the pixel area of the DMD 4 is larger than the output opening 23b of the rod integrator 23.

Further, the input opening 23a of the rod integrator 23 may be larger or smaller than the opening of the light shielding plate 24, or may have the same size as that of the opening of the light shielding plate 24. In order to produce the above-discussed effect of the light shielding plate 24, however, it is preferable that the luminous flux condensed by the condensing lenses 21 and 22 should neither go outside the rod integrator 23 nor go into the end surfaces of the reflection mirrors constituting the rod integrator 23. Further, in terms of the light use efficiency, it is preferable that more quantity of light enter the rod integrator 23. In view of these points, it is preferable that the opening of the light shielding plate 24 and the input opening 23a of the rod integrator 23 should have substantially the same size (the difference of size in accordance with the above points of view is allowed) (see an exemplary case shown in FIG. 5).

Pixel areas of DMDs 4 have various aspect ratios. In the WUXGA, for example, a pixel area consists of 1920×1200 pixels and the aspect ratio is about 16:10. In the XGA, a pixel area consists of 1027×768 pixels and the aspect ratio is about 4:3. In the 1080P, a pixel area consists of 1920×1080 pixels and the aspect ratio is about 16:9.

For this reason, in accordance with the aspect ratio of the pixel area of the mounted DMD 4, the type of the rod integrator 23 to be used is determined. On the other hand, since such a contrivance as discussed below is applied to the light shielding plate 24, one type of light shielding plate 24 is adaptable to a plurality of types of DMDs 4, and in other words, adaptable to a plurality of types of rod integrators 23.

Herein, the constituent elements other than the DMD 4, the rod integrator 23, and the light shielding plate 24 are commonly used regardless of the types of mounted DMD 4 and rod integrator 23.

Figure 8:
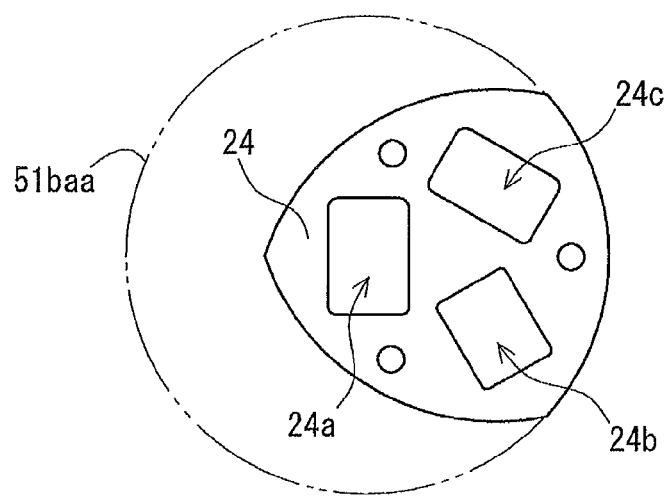
FIG. 8 is a plan view showing the light shielding plate in accordance with the preferred embodiment.

FIG. 8 is a plan view showing the light shielding plate 24. FIG. 8 corresponds to a view in which the constituent elements other than the light shielding plate 24 are removed from FIG. 6. An outer shape of the second holding member 51b (in other words, a shape of an inner wall surface of the first lens barrel 52a), however, is indicated by two-dot chain line.

The light shielding plate 24 shown in FIG. 8 is provided with three types of openings 24a, 24b, and 24c. All the openings 24a, 24b, and 24c are rectangular openings used to pass the outgoing light from the light source unit 2 to the rod integrator 23 but have different aspect ratios. For example, the opening 24a has the aspect ratio for the WUXGA, the opening 24b has the aspect ratio for the XGA, and the opening 24c has the aspect ratio for the 1080P.

The three types of openings 24a, 24b, and 24c are selectively used in accordance with the aspect ratio of the pixel area of the actually mounted DMD 4, and in other words, the aspect ratio of the input opening 23a of the rod integrator 23. More specifically, the light shielding plate 24 is arranged in a state where one of the openings 24a, 24b, and 24c, which has a shape similar to that of the input opening 23a of the mounted rod integrator 23, is aligned with the input opening 23a.

The alignment of the two openings refers to a state where (a) the respective centers of the openings coincide with each other and (b) corresponding sides are parallel to each other. Further, in the case of rectangular openings, a condition (c) that the openings have the same longitudinal directions (in other words, the longitudinal directions are parallel to each other) may be used, instead of the condition (b).

Figure 10:
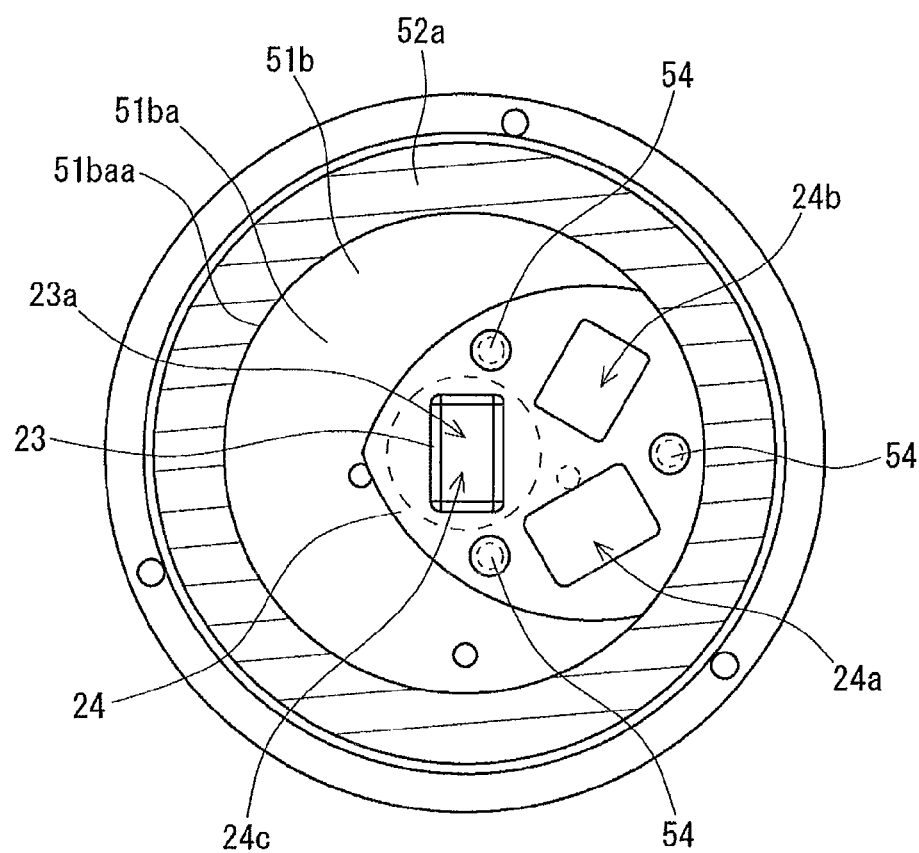

For example, FIG. 6 shows a case where the opening 24a is paired with the rod integrator 23. FIG. 9 shows a case where the opening 24b is paired with the rod integrator 23, and FIG. 10 shows a case where the opening 24c is paired with the rod integrator 23.

Thus, the light shielding plate 24 has three types of openings 24a, 24b, and 24c, and one of these openings 24a, 24b, and 24c is selectively used. Therefore, one type of light shielding plate 24 can be used commonly for three types of rod integrators 23, and in other words, for three types of DMDs 4.

As a result, it is possible to reduce the number of types of press dies used for manufacturing light shielding plates. Specifically, by using the light shielding plate 24, it is possible to reduce the number of types of press dies to one third as compared with a ease of using a light shielding plate having only one opening. Therefore, it is possible to cut the manufacturing cost of the press die.

Further, as compared with a case where a light shielding plate having only the opening 24a, a light shielding plate having only the opening 24b, and a light shielding plate having only the opening 24c are separately manufactured, it is possible to reduce the amount of material for the light shielding plate.

Exemplary sizes of the openings 24a, 24b, and 24c are as follows. The opening 24a for the WUXGA has a width of 10.72 mm and a length of 7.38 mm, the opening 24b for the XGA has a width of 9.3 mm and a length of 7.3 mm, and the opening 24c for the 1080P has a width of 10.72 mm and a length of 6.73 mm.

In such an exemplary case, the openings 24a and 24c have the same width and different lengths with the difference of only 0.65 mm (=7.38 mm−6.73 mm). Therefore, if a light shielding plate having only the opening 24a and a light shielding plate having only the light source unita4 24c are manufactured, it is difficult to discriminate between the openings 24a and 24c by visual check of only the light shielding plate.

For this reason, there is a possibility, for example, that a wrong light shielding plate which is different from the designated type may be sent from a parts production plant to an assembly plant. Further, there is another possibility, for example, that such a wrong light shielding plate is put from a parts warehouse to an assembly line and attached to a device. Furthermore, if different types of light shielding plates are mixed, it is difficult to correctly discriminate these light shielding plates from correct light shielding plates by visual check.

In contrast to this, the light shielding plate 24 can solve such problems. Even when three types of video display devices 1 on which different types of DMDs 4 are mounted, respectively, are manufactured in the same plant (these video display devices 1 may be manufactured in the same line or in different lines), one type of light shielding plates have only to be supplied to the assembly line(s). Therefore, there is no case where different types of light shielding plates are wrongly supplied. Further, even when the ratio in the number of the WUXGA, the XGA, and the 1080P to be manufactured is changed after the production of the light shielding plates, it is possible to suppress the deficiency and excess in the number of light shielding plates to be supplied to the assembly line.

In view of the above-discussed effects, the adoption of the light shielding plate 24 is favorable particularly for production of video display devices in high-variety low-volume manufacturing, such as production of projectors for commercial use.

Figure 11:
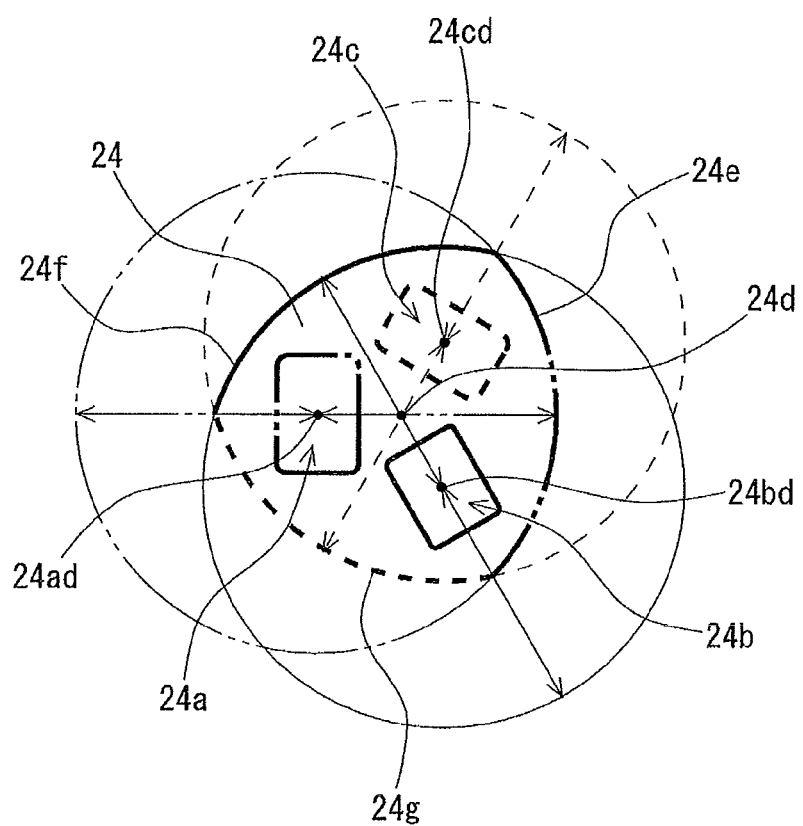
FIG. 11 is a view used for explanation of a shape of the light shielding plate in accordance with the preferred embodiment.

FIG. 11 is a view used for explanation of a shape of the light shielding plate 24. FIG. 11 is a plan view like FIG. 8 but uses drawing lines of various thicknesses and kinds, for clear explanation.

As shown in FIG. 11, the openings 24a, 24b, and 24c of the light shielding plate 24 are arranged radially from a center 24d of the light shielding plate 24. The arrangement of the openings is not limited to this type arrangement, but the openings 24a, 24b, and 24c can be compactly provided in the radical arrangement. It is thereby possible to reduce the size of the light shielding plate 24 and reduce the amount of material therefor.

In an exemplary case of FIG. 11, respective centers 24ad, 24bd, and 24cd of the openings 24a, 24b, and 24c are positioned at equal angle (i.e., 120 degrees) in the circumferential direction with the center 24d of the light shielding plate 24 as a center and at equal distance from the center 24d of the light shielding plate 24.

Further, as discussed above, the light shielding plate 24 is attached to the end surface 51ba of the second holding member 51b, and the light shielding plate 24 has such a shape as not to extend off the end surface 51ba of the second holding member 51b even in a state where any one of the openings 24a, 24b, and 24c is aligned with the input opening 23a of the rod integrator 23 (see FIGS. 6, 9, and 10). It is thereby possible to reduce the size of the light shielding plate 24 and consequently possible to reduce the amount of material for the light shielding plate.

Since the light shielding plate 24 does not extend off the end surface 51ba of the second holding member 51b, the size of the light shielding plate 24 does not have any influence on the design of an inner diameter of the lens barrel 52. This makes it easier to design the size of the lens barrel 52 and select the material therefor.

An exemplary shape of the light shielding plate 24 which does not extend off the end surface 51ba of the second holding member 51b can be seen from FIGS. 6, 9, and 10. Specifically, even in a state where any one of the openings 24a, 24b, and 24c is aligned with the rod integrator 23, one of portions 24e, 24f, and 24g of an outer edge of the light shielding plate 24 (see FIG. 11) coincides with an outer edge 51baa of the end surface 51ba of the second holding member 51b.

More specifically, a portion 24e of the outer edge of the light shielding plate 24 is an are defined by a predetermined radius with the center 24ad of the opening 24a as a center. Another portion 24f of the outer edge of the light shielding plate 24 is an arc defined by the predetermined radius with the center 24bd of the opening 24b as a center. The other portion 24g of the outer edge of the light shielding plate 24 is an arc defined by the predetermined radius with the center 24cd of the opening 24c as a center. These arcs are sequentially connected to one another to form the outer edge of the light shielding plate 24. Herein, the predetermined radius is a radius of a circumference forming the outer edge 51baa of the end surface 51ba of the second holding member 51b.

The portion 24e of the outer edge of the light shielding plate 24 is positioned on the side opposite to the opening 24a when viewed from the center 24d of the light shielding plate 24. The portion 24f of the outer edge of the light shielding plate 24 is positioned on the side opposite to the opening 24b when viewed from the center 24d of the light shielding plate 24. The portion 24g of the outer edge of the light shielding plate 24 is positioned on the side opposite to the opening 24c when viewed from the center 24d of the light shielding plate 24. The portions 24e, 24f, and 24g are convex in a direction farther away from the center 24d of the light shielding plate 24.

With such a shape, it is possible to position the light shielding plate 24 only by making one of the portions 24e, 24f, and 24g of the outer edge of the light shielding plate 24 coincident with the outer edge 51baa of the end surface 51ba of the second holding member 51b. It is therefore possible to easily position the light shielding plate 24.

The holding member 51 on which the light shielding plate 24 is attached has such a size as not to extend off an outer shape of the relatively large condensing lens 21 (and the relay lenses 26 and 27 having almost the same size as that of the condensing lens 21) when viewed from on the central axis of the lens barrel 52. Therefore, the size of the holding member 51 does not have any influence on the design of the inner diameter of the lens barrel 52. This also makes it easier to design the size of the lens barrel 52 and select the material therefor.

For example, an outermost diameter of the condensing lens 21 and the relay lenses 26 and 27 is substantially 50 mm, an outermost diameter of the holding member 51 (more specifically, an outermost diameter of the second holding member 51b) is substantially 45 mm, and the radius of the arcs 24e, 24f, and 24g constituting the outer edge of the light shielding plate 24 is substantially 22 mm. The radius of the arcs 24e, 24f, and 24g corresponds to a distance between the central axis of the lens barrel 52 and the arc portions 24e, 24f, or 24g which is the farthest away from the central axis of the lens barrel 52. Therefore, in the above-discussed example of size, the light shielding plate 24 does not extend off the holding member 51 and the holding member 51 does not extend off the lenses 21, 26, and 27 when viewed from on the central axis of the lens barrel 52.

Therefore, when the first lens barrel 52a which accommodates the condensing lenses 21 and 22 and the holding member 51 is manufactured by cutting a round bar or a pipe, for example, the outer diameter of the round bar or the pipe has only to have a size obtained by adding the thickness of the lens barrel 52 to the outermost diameter of the condensing lens 21. The same applies to the third lens barrel 52c which accommodates the relay lenses 26 and 27. The second lens barrel 52b has only to have such a size as to accommodate the relay lens 25 and couple the lens barrel 52a with the lens barrel 52c. In other words, it is not necessary to prepare a large material having an outer diameter much larger than the outermost diameter of the condensing lens 21 in order to accommodate the light shielding plate 24 in the lens barrel 52. It is therefore possible to reduce the manufacturing cost of the lens barrel 52.

With the above-discussed structure, it is possible to reduce the parts cost (in other words, parts manufacturing cost) and increase productivity from various aspects. This effect contributes to, for example, lower prices of the video display devices 1.

Though discussion has been made on various characteristic features of the shape of the light shielding plate 24, a light shielding plate may be configured differently by adopting one or more of the characteristic features, and effects caused by the adopted characteristic feature(s) are produced.

Hereinafter, discussion will be made on various variations.

In the above-discussed case, the openings 24a, 24b, and 24c of the light shielding plate 24 have different aspect ratios. In contrast to this, part of or all of the openings 24a, 24b, and 24c may have the same aspect ratio and different sizes. For example, the XGA and the SXGA+ have the same aspect ratio of 4:3 but have pixel areas of different sizes Specifically, the pixel area of the XGA consists of 1024×768 pixels and the pixel area of the SXGA+ consists of 1400×1050 pixels. Therefore, there may be a case, for example, where the opening 24a is formed for the WUXGA, the opening 24b is formed for the XGA, and the opening 24c is formed for the SXGA+.

The number of openings of the light shielding plate 24 may be two, four, or more.

Further, a video display device may be provided to have a structure in which other constituent elements are added to the structure of the video display device 1 (see FIG. 1) discussed above.

Conversely, a video display device may be provided to have a structure in which some constituent elements are omitted from the structure of the video display device 1 (see FIG. 1) discussed above. For example, a video display device may be provided to have a structure in which the projection unit 5 and the screen 6 are omitted, a structure in which the photodetector unit 7 is omitted, a structure in which the projection unit 5, the screen 6, and the photodetector unit 7 are omitted, and the like. Further, a video display device may be provided to have a structure in which the DMD 4 is omitted. By providing such a simplified structure, a person who acquires the structure can use the structure in combination with particular elements corresponding to the omitted elements.

Though discussion has been made on the video display device 1 for full-color display, the video display device 1 may be configured, for example, for single-color display.

While the invention has been shown and described in detail, the foregoing description is in all aspects illustrative and not restrictive. It is therefore understood that numerous modifications and variations can be devised without departing from the scope of the invention.

What is claimed is:

1. A video display device comprising: a light source unit; a display device having a pixel area in which a display video image is to be formed; and a light guide unit for guiding outgoing light from said light source unit to said pixel area of said display device, wherein said light guide unit includes a rod integrator having an input opening through which said outgoing light from said light source unit enters and an output opening provided on a side opposite to said input opening; and a light shielding plate provided between said input opening of said rod integrator and said light source unit, and said light shielding plate has a plurality of openings for passing said outgoing light from said light source unit to said rod integrator, said plurality of openings correspond to a plurality of openings respectively, and each of said plurality of openings has a predetermined fixed shape, and said light shielding plate is arranged in a state where one of said plurality of openings, which has a shape similar to that of said input opening of said rod integrator which is actually mounted, is aligned with said input opening.

2. The video display device according to claim 1, wherein said plurality of openings of said light shielding plate are arranged radially from a center of said light shielding plate.

3. The video display device according to claim 2, wherein said light guide unit further includes a holding member for holding said rod integrator, said holding member has an end surface having a shape surrounding said input opening of said rod integrator,
said light shielding plate is attached to said end surface of said holding member in said state, and said light shielding plate does not extend off said end surface even when said light shielding plate is attached to said end surface in said state with respect to any one of said plurality of openings.

4. The video display device according to claim 3, wherein a portion of an outer edge of said light shielding plate coincides with an outer edge of said end surface even when said light shielding plate is attached to said end surface in said state with respect to any one of said plurality of openings.

5. The video display device according to claim 4, wherein said outer edge of said end surface of said holding member has a circle having a predetermined radius, and
said outer edge of said light shielding plate is constituted of a combination of arcs each defined by said predetermined radius.

6. The video display device according to claim 3, wherein said light guide unit further includes:
a condensing lens provided between said light shielding plate and said light source unit; and a lens barrel for accommodating said condensing lens and said holding member, and wherein said holding member has such a size as not to extend off said condensing lens when viewed from on a central axis of said lens barrel.

7. The video display device according to claim 4, wherein said light guide unit further includes:

a condensing lens provided between said light shielding plate and said light source unit; and a lens barrel for accommodating said condensing lens and said holding member, and wherein said holding member has such a size as not to extend off said condensing lens when viewed from on a central axis of said lens barrel.

8. The video display device according to claim 5, wherein said light guide unit further includes:

a condensing lens provided between said light shielding plate and said light source unit; and a lens barrel for accommodating said condensing lens and said holding member, and wherein said holding member has such a size as not to extend off said condensing lens when viewed from on a central axis of said lens barrel.

9. A light guide module mounted on a video display device and used for guiding outgoing light from a light source unit to a pixel area of a display device, comprising: a rod integrator having an input opening through which said outgoing light from said light source unit enters and an output opening provided on a side opposite to said input opening; and a light shielding plate provided between said input opening of said rod integrator and said light source unit, wherein said light shielding plate has a plurality of openings for passing said outgoing light from said light source unit to said rod integrator, and is arranged in a state where one of said plurality of openings, which has a shape similar to that of said input opening of said rod integrator which is mounted, is aligned with said input opening.

* * * * *